United States Patent [19]

Nishioka et al.

[11] Patent Number: 4,955,453
[45] Date of Patent: Sep. 11, 1990

[54] PREVENTION AGAINST CAR BURGLAR

[75] Inventors: Keiichi Nishioka, Kawasaki; Atsushi Hirako, Yokohama, both of Japan

[73] Assignee: Isuzu Motors Limited, Tokyo, Japan

[21] Appl. No.: 410,873

[22] Filed: Sep. 22, 1989

[30] Foreign Application Priority Data

Oct. 6, 1988 [JP] Japan .................................. 63-252424
Aug. 11, 1989 [JP] Japan .................................. 1-208558

[51] Int. Cl.$^5$ ............................................. B60R 25/00
[52] U.S. Cl. ..................................... 180/287; 180/289
[58] Field of Search ................................ 180/287, 289

[56] References Cited

U.S. PATENT DOCUMENTS

| | | | |
|---|---|---|---|
| 4,745,897 | 5/1988 | Tejeda | 180/287 |
| 4,852,681 | 8/1989 | Bombled | 180/287 |
| 4,884,654 | 12/1989 | Durigon | 180/287 |
| 4,892,167 | 1/1990 | Tejeda | 180/287 |

Primary Examiner—Kenneth R. Rice
Attorney, Agent, or Firm—Spencer & Frank

[57] ABSTRACT

Disclosed herein is a system whereby a car burglar can be prevented while a driver leaves a car as engine going. Upon detection of the driver getting off the car as engine idling, a predetermined device other than equipment belonging to an engine starting system is actuated to a state not ready for the car to start. The device is then turned to a state ready for the car to restart through a predetermined enciphered operation.

16 Claims, 11 Drawing Sheets

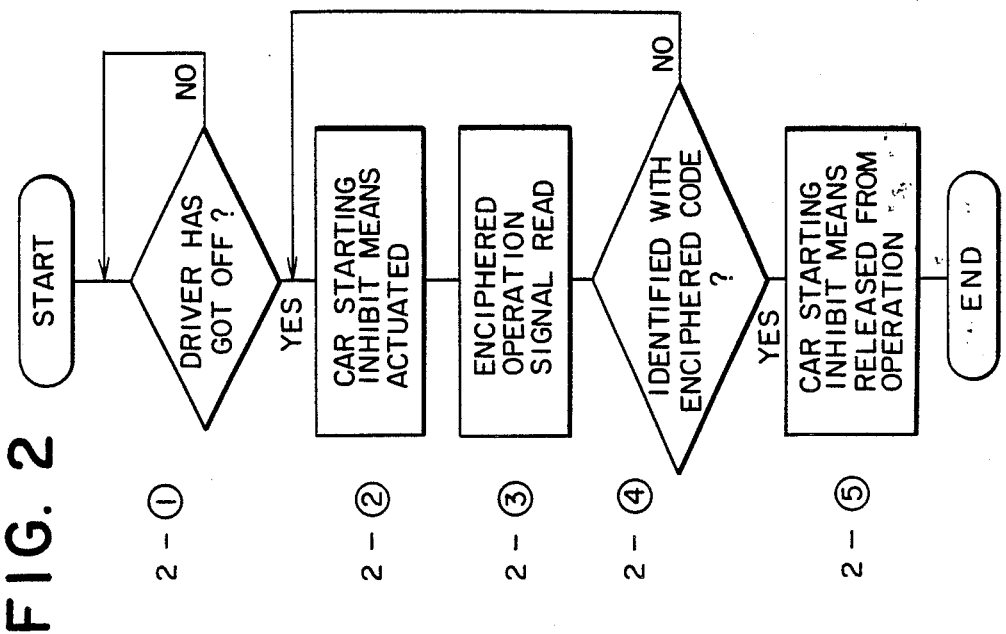
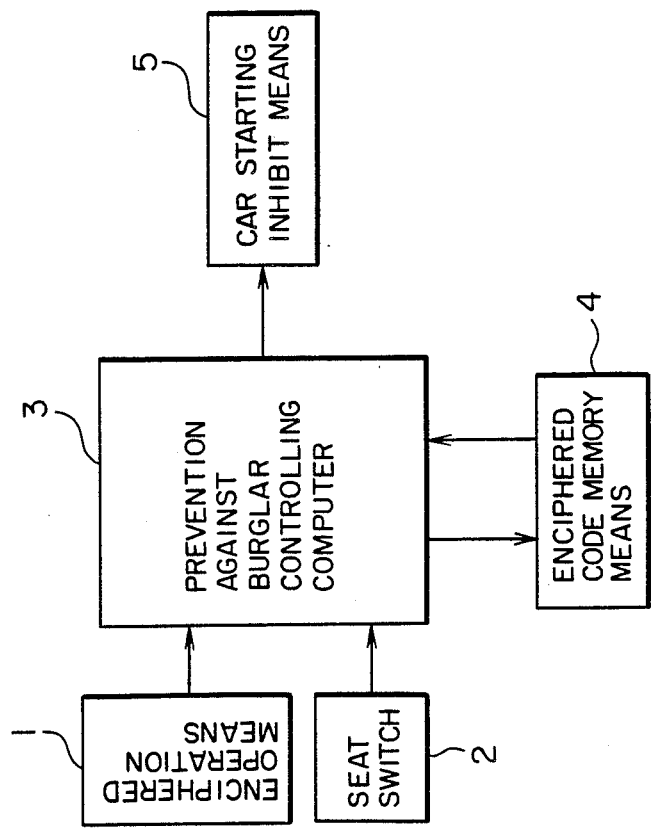

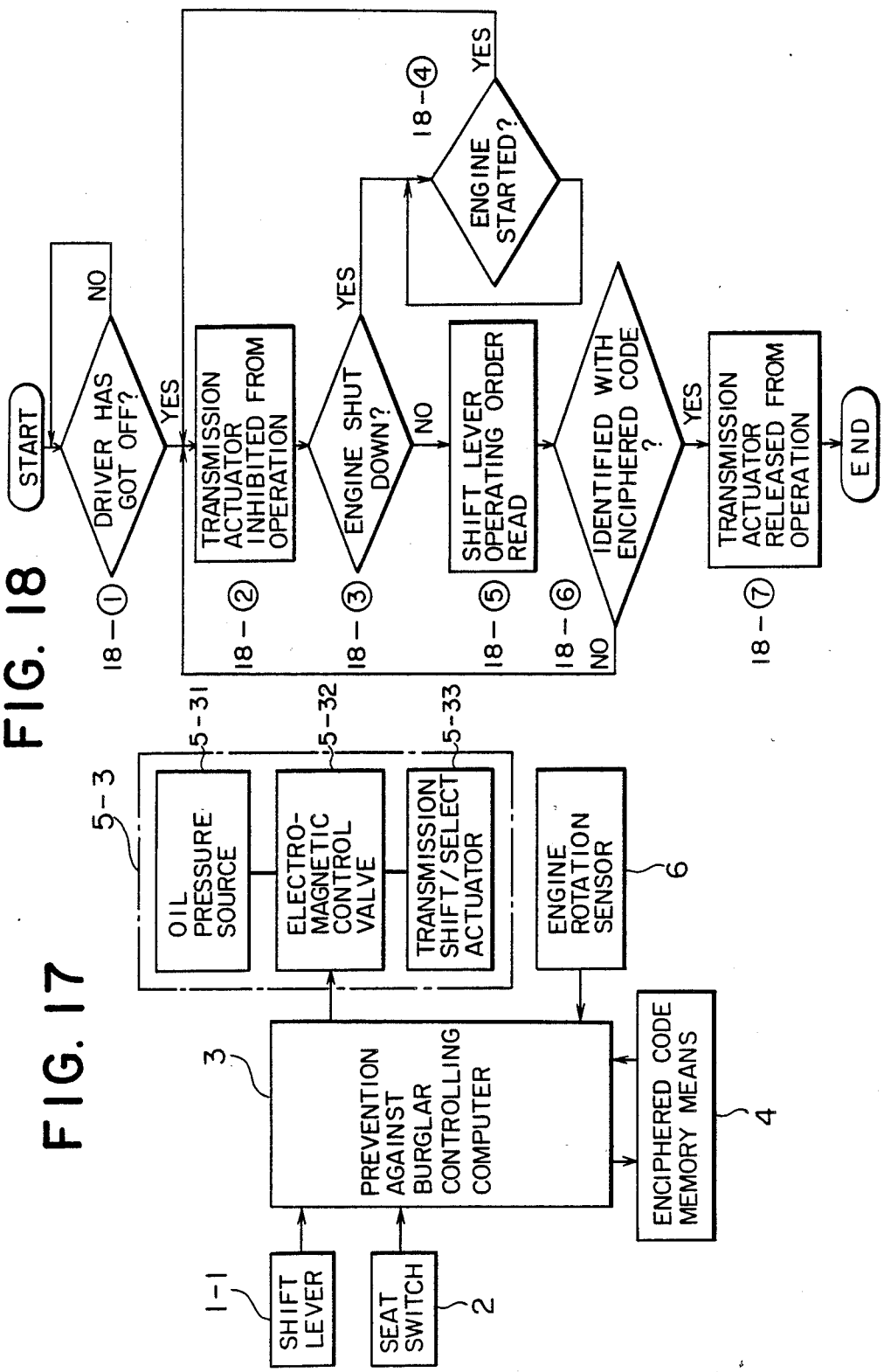

PREVENTION AGAINST CAR BURGLAR

BACKGROUND OF THE INVENTION

1. Field of the Invention

The present invention relates to a system for preventing a car burglar.

2. Description of the Prior Art

A prior art prevention against car burglar comprises providing a burglar preventing switch in series to an engine starting circuit. The burglar preventing switch is turned on only at the time when a predetermined operation is done.

Accordingly, if a thief is to start up an engine for the purpose of burglarizing a car, the engine does not go as he is totally not acquainted with how to operate particularly therefor. Thus the car can be prevented from burglar.

Such prevention against car burglar is then disclosed in, for example, Japanese Utility Model Laid-Open No. 158742/1983, Japanese Patent Laid-Open No. 124553/1985, Japanese Utility Model Laid-Open No. 42459/1988 and others.

However, in the prior art system mentioned as above, the engine must once be shut down so as to prevent a car burglar. Thus, equipment (such as, for example, air conditioner, heater, defroster and necessary others) operating so far to keep the environmental conditions of a car room comfortable must also be stopped, thus deteriorating the environmental conditions before the driver returns to the car.

SUMMARY OF THE INVENTION

An object of the invention is to provide a system capable of preventing a car burglar as idling an engine so as to keep equipment for maintaining environmental conditions of a car room in a comfortable state operating while a driver leaves the car. According to the invention, comfortable conditions of a car room will be left as ever before for the driver coming back to the car.

Another object of the invention is to provide a prevention against car burglar whereby a car cannot be started from actuating the engine unless a predetermined enciphered operation is carried out.

These and other objects of the invention will become more apparent in the detailed description and examples which follow.

BRIEF DESCRIPTION OF THE DRAWINGS

FIG. 1 is a block diagram representing one embodiment of the invention;

FIG. 2 is a flowchart for illustrating an operation of the block diagram of FIG. 1;

FIG. 17 is a block diagram representing a further illustrative example of the embodiment of FIG. 11;

FIG. 18 is a flowchart for illustrating an operation of the block diagram of FIG. 17;

DETAILED DESCRIPTION OF PREFERRED EMBODIMENTS

Figure 4:
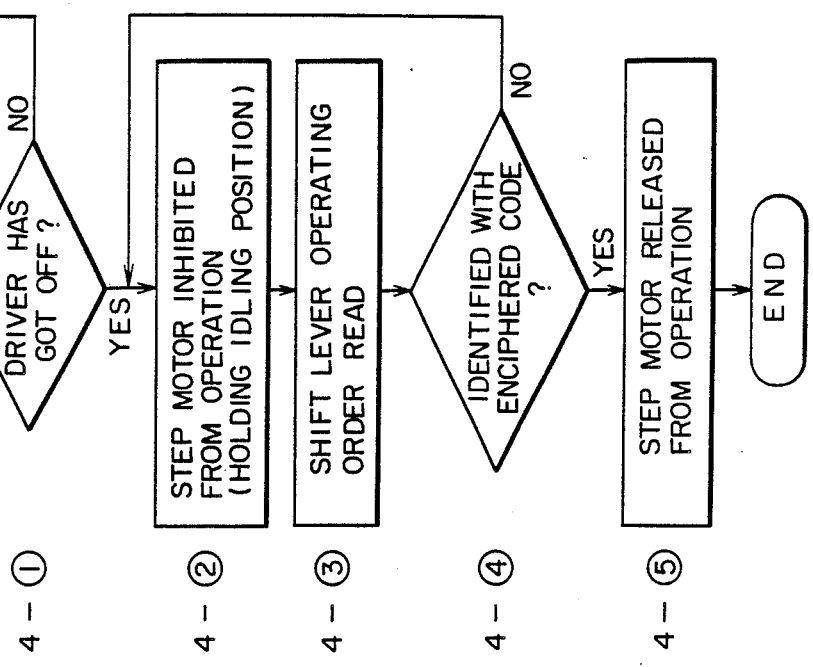
FIG. 4 is a flowchart for illustrating an operation of the block diagram of FIG. 3.

FIG. 1 is a block diagram representing one embodiment of the invention. In FIG. 1, 1 denotes enciphered operation means, 2 denotes a seat switch as driver's off detection means, 3 denotes a prevention against burglar controlling computer, 4 denotes enciphered code memory means, and 5 denotes car starting inhibit means.

The enciphered operation means 1 is that for generating a cipher signal through an operation meaningless apparently which has nothing to do with the car starting operation.

Accordingly, the enciphered operation means 1 may take any form of construction subject to being operable before car starting and capable of providing an electrical signal to the prevention against burglar controlling computer 3. For example, shift lever provided with a switch for detecting shift position of a gear, various lamp switches, wiper switch and brake (brake provided with a brake switch) are conceivable.

The seat switch 2 is one example of such means as will detect whether or not a driver gets off, and is provided on a driver seat.

The enciphered code memory means 4 is that for storing predetermined codes.

The car starting inhibit means 5 is capable of inhibiting a car from starting despite engine going. A step motor for controlling a feed of fuel to engines, a clutch actuator, a transmission shift/select actuator, a brake actuator and the like may be taken up as such means.

Equipment already provided on a car may be utilized as enciphered operation means and car starting inhibit means. Accordingly, the prevention against car burglar relating to the invention may be constructed inexpensively.

The prevention against burglar controlling computer 3 decides whether or not a driver has got off according to a signal from the seat switch 2. Further, it collates a cipher signal generated by operating the enciphered operation means 1 with an enciphered code stored in the enciphered code memory means 4, and if unidentified, it sends a signal to the car starting inhibit means 5 to keep the car from starting.

Since a thief to burglarize the car is not acquainted with how to operate the enciphered operation means 1, the cipher codes will never be identified. Thus, the car starting inhibit means 5 is not ready for starting the car notwithstanding. Consequently, the car can be prevented from burglar despite the engine idling.

Accordingly, equipment for keeping a car room comfortable (such as, for example, air conditioner, heater, defroster and the like) can be kept going while a driver leaves the car. Thus, the comfortable car room still is left as ever before for the driver coming back to the car.

FIG. 2 is a flowchart for illustrating an operation of the block diagram of FIG. 1. Items 2 - 1 to 2 - 5 in the description of FIG. 2 are coordinated with steps 2 - 1 to 2 - 5 of FIG. 2.

2 - 1 Decides whether or not a driver gets off according to a signal from the seat switch 2.

2 - 2 If the driver got off, then a signal is sent from the prevention against burglar controlling computer 3 to the car starting inhibit means 5 to actuate the car starting inhibit means 5 so as not to allow a car to start.

2 - 3 Reads an enciphered operation signal generated by the enciphered operation means 1.
If the car's driver, then he should thoroughly be acquainted with the enciphered operation, and hence is capable of generating a correct enciphered operation signal, but nobody else can do so.

2 - 4 Checks to ensure that the read signal is identified with an enciphered code stored beforehand in the enciphered code memory means 4.
If not identified, then returns to step 2 - 2 .

2 - 5 If identified, operation of the car starting inhibit means 5 is cleared to a state ready for starting.

Figure 3:
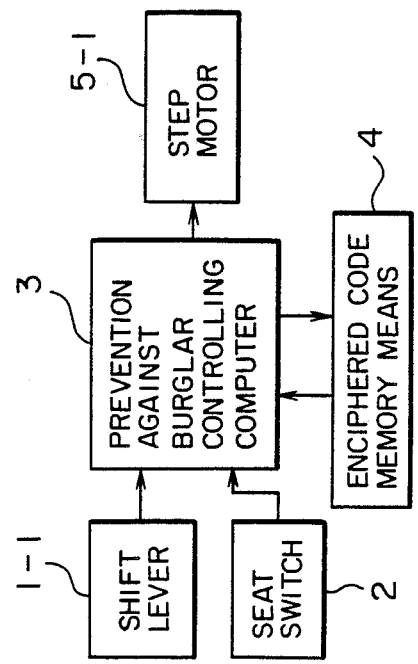
FIG. 3 is a block diagram representing an illustrative example of the embodiment of FIG. 1.

FIG. 3 is a block diagram representing an illustrative example of the embodiment of FIG. 1.

In the illustrative example, a shift lever 1-1 with a shift switch (switch turned on according to a gear position) is employed as the enciphered operation means.

A shift operation in the order of range N→D5→2→R→N, for example, is conceivable for the enciphered operation using the shift lever 1—1. This may be determined arbitrarily. The shift switch is actuated according to the operation, and the signal generated thereby works as an enciphered operation signal.

The aforementioned operation of the shift lever 1-1 will be meaningless downright judging from a normal operation for starting a car. Accordingly, a thief to burglarize the car has no knowing of the operation.

Then in the illustrative example, a step motor 5-1 used for throttle control (gasoline car) and injection control (Diesel car) is utilized as the car starting inhibit means. The step motor 5-1 controls a feed of fuel, therefore a car can be inhibited from starting by limiting the feed of fuel to an engine.

FIG. 4 is a flowchart for illustrating an operation of the block diagram of FIG. 3. Items 4 1 1 to 4 - 5 in the following description are coordinated with steps 4 - 1 to 4 - 5 of FIG. 4.

4 - 1 Corresponds to 2 of FIG. 2.

4 - 2 When a driver gets off, the step motor 5-1 is forced to hold an idling position according to a signal from the prevention against burglar controlling computer 3. The engine then runs at low speed, which is not ready for starting.

4 - 3 Reads the signal according to an operation of the shift lever 11. If a predetermined enciphered operation is done correctly, then an enciphered operation signal identified with an enciphered code is generated, which will be read accordingly.

4 - 4 Corresponds to 2 FIG. 2. If the read enciphered operation signal is not identified with the enciphered code, the procedure returns to step 4 - 2 , therefore the engine rotational frequency remains as idling even from stepping so hard on the gas and is not ready for starting.

4 - 5 If the read enciphered operation signal is identified with the enciphered code, then the step motor 5-1 forced to hold idling position is released. That is, a fuel is fed according to the rate of stepping, the engine rotational frequency can be increased and thus is ready for starting.

Figure 5:
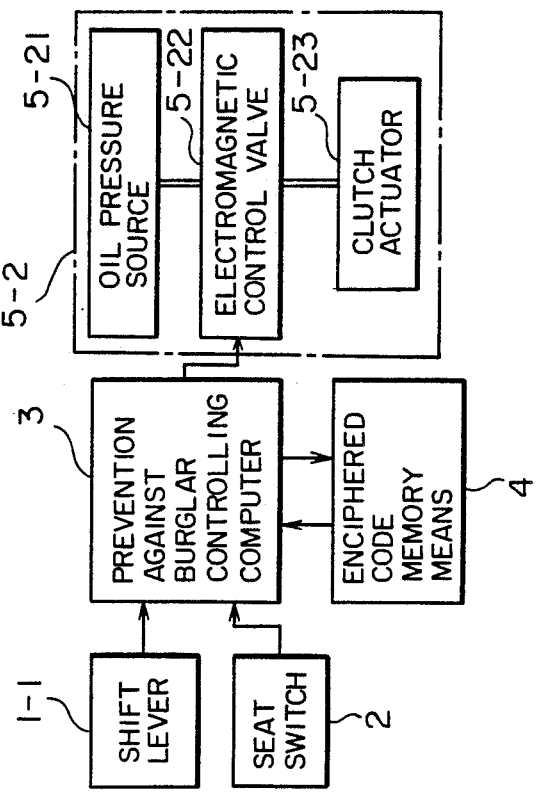
FIG. 5 is a block diagram representing another illustrative example of the embodiment of FIG. 1.

FIG. 5 is a block diagram representing another illustrative example of the embodiment of FIG. 1. In the illustrative example, the shift lever 11 is utilized as a ciphered operation means, and a clutch control part 5-2 is utilized as car starting inhibit means. A clutch actuator 5-23 of the clutch control part 5-2 turns a clutch "on" and "off". Then, the clutch actuator 5-23 is driven on pressure from an oil pressure source 5-21, and the oil pressure is controlled by an electromagnetic control valve 5-22.

For keeping a car inhibited from starting, the clutch actuator 5-23 is driven forcedly to hold the clutch "off".

The clutch is released from an "off" state only at the time when driver takes a driver seat and the shift lever 11 is manipulated correctly for enciphered operation, and the clutch is then subjected to the driver's on/off manipulation. The car is thus ready for starting.

Figure 6:
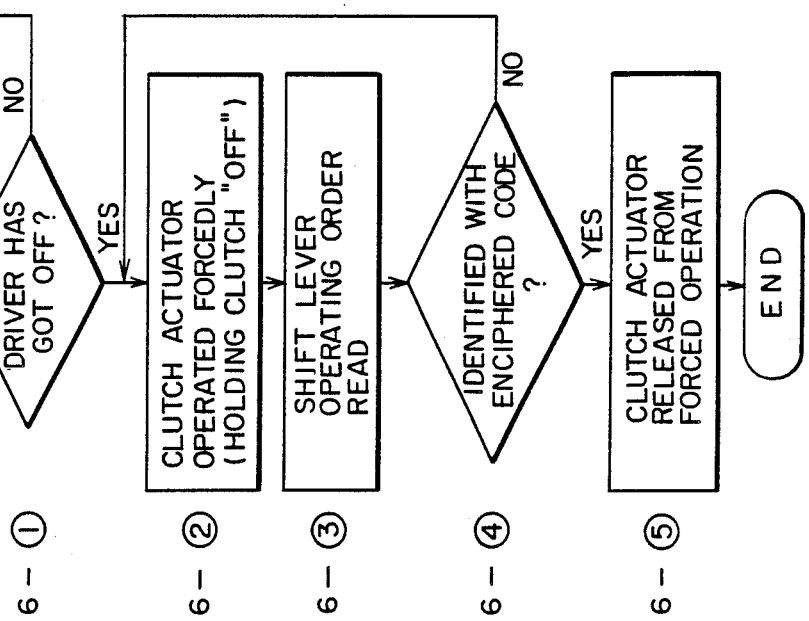
FIG. 6 is a flowchart for illustrating an operation of the block diagram of FIG. 5.

FIG. 6 is a flowchart for illustrating an operation of the block diagram of FIG. 5. The operation will easily be understood from referring to FIG. 2, therefore a further detailed description is omitted here.

Figure 7:
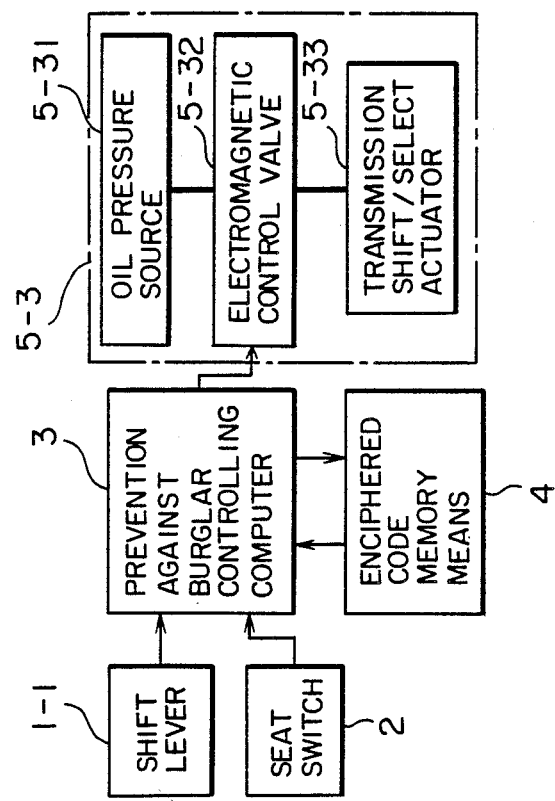
FIG. 7 is a block diagram representing another illustrative example of the embodiment of FIG. 1.

FIG. 7 is a block diagram representing a further illustrative example of the embodiment of FIG. 1. In the illustrative example, the shift lever 11 is utilized as enciphered operation means, and a transmission control part 5-3 is utilized as car starting inhibit means.

A transmission shift/select actuator 5-33 of the transmission control part 5-3 is that for shifting a gear position. The transmission shift/select actuator 5-33 is driven on pressure from an oil pressure source 5-31, and the oil pressure is controlled by an electromagnetic control valve 5-32.

When a driver gets off, the gear position is forcedly held neutral. Then, so far as an enciphered operation signal generated by operation of the shift lever 1-1 is not identified with an enciphered code, the gear position so held will not be released. When identified with the enciphered code to release, the gear position is shifted according to operation of the shift lever 1-1 thereafter, and thus a car is ready for starting.

Figure 8:
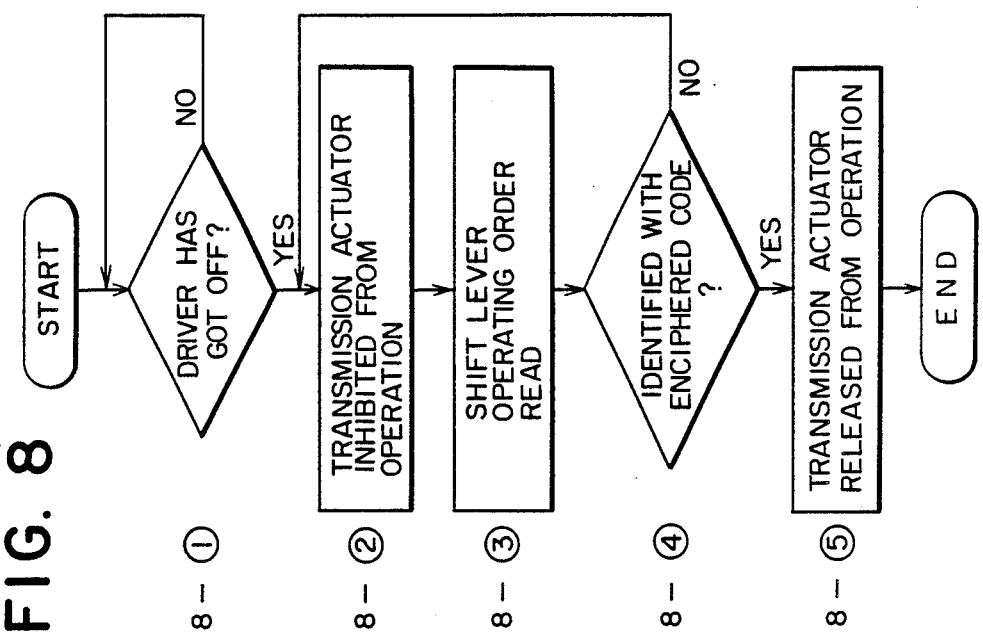
FIG. 8 is a flowchart for illustrating an operation of the block diagram of FIG. 7.

FIG. 8 is a flowchart for illustrating an operation of the block diagram of FIG. 7. The operation will easily be understood from referring to FIG. 2, therefore a further detailed description is omitted here.

Figure 9:
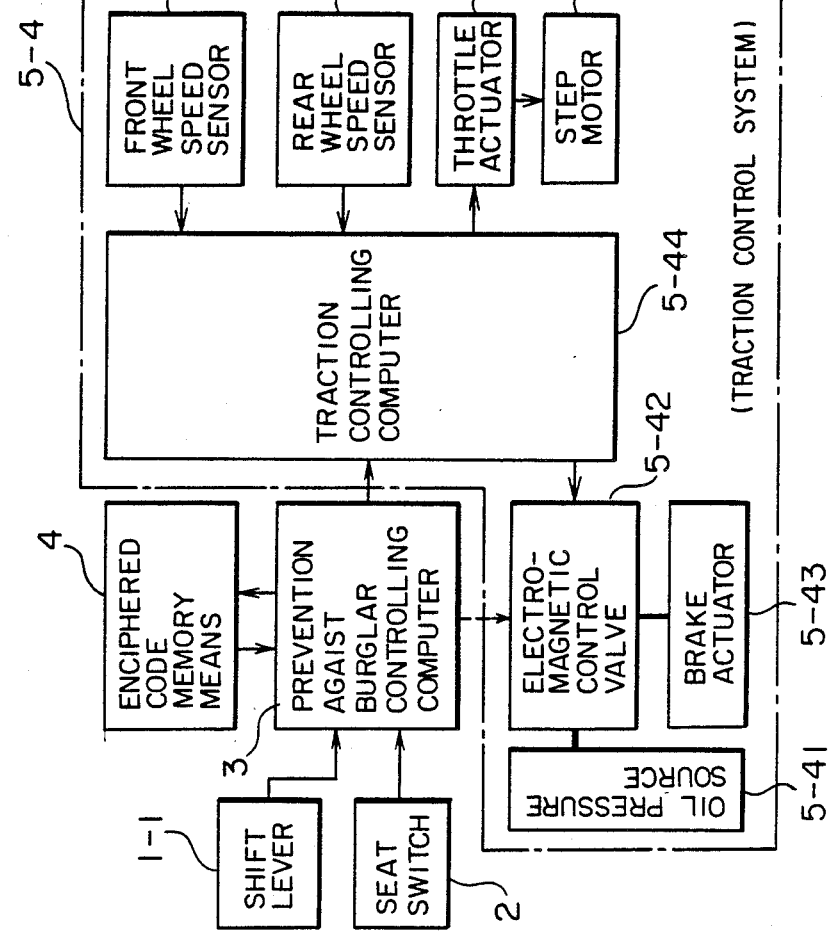
FIG. 9 is a block diagram representing a further illustrative example of the embodiment of FIG. 1.

FIG. 9 is a block diagram representing another illustrative example of the embodiment of FIG. 1. In the illustrative example, the shift lever 1-1 is utilized as enciphered operation means, and a traction control system 5-4 is utilized as car starting inhibit means.

There is a car on which the traction control system 5-4 for brake control is mounted, and in such car, it can be utilized as car starting inhibit means.

The traction control system comprises controlling a feed of fuel to an engine and a brake power, thereby increasing a frictional force between wheels and the ground, and the system is effective when, for example, getting out of a muddy place.

A brake actuator 5-43 is that for controlling a brake, and is driven on pressure from an oil pressure source 5-41, the oil pressure being controlled by an electromagnetic control valve 5-42. The electromagnetic control valve 5-42 is controlled on a signal from the prevention against burglar controlling computer 3 through a traction control computer 5-44.

Then, 5-45 denotes a front wheel speed sensor, 5-46 denotes a rear wheel speed sensor, 5-47 denotes a throttle actuator, and 5-48 denotes a step motor.

When a driver gets off, the brake actuator 5-43 is driven and braked forcedly and holds such state. Then, only at the time when the driver takes a seat and manipulates the shift lever 1-1 correctly for enciphered operation, the braked state is released and a car is ready for starting.

Figure 10:
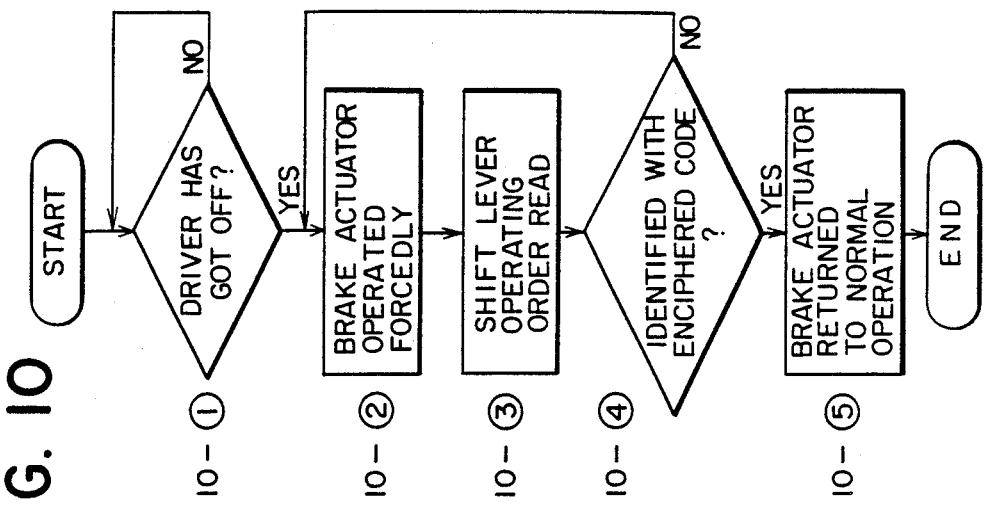
FIG. 10 is a flowchart for illustrating an operation of the block diagram of FIG. 9.

FIG. 10 is a flowchart for illustrating an operation of the block diagram of FIG. 9. The operation will also be easily understood from referring to FIG. 2, therefore a detailed description is omitted here.

In a car on which the traction control system 5-4 is not mounted, if the oil pressure source 5-41, the electromagnetic control valve 5-42 and the brake actuator 5-43 are installed, these may be utilized as car starting inhibit means. In such case, a signal will be sent to the electromagnetic control valve 5-42 from the prevention against burglar controlling computer 3 as indicated by a dotted line.

Figure 11:
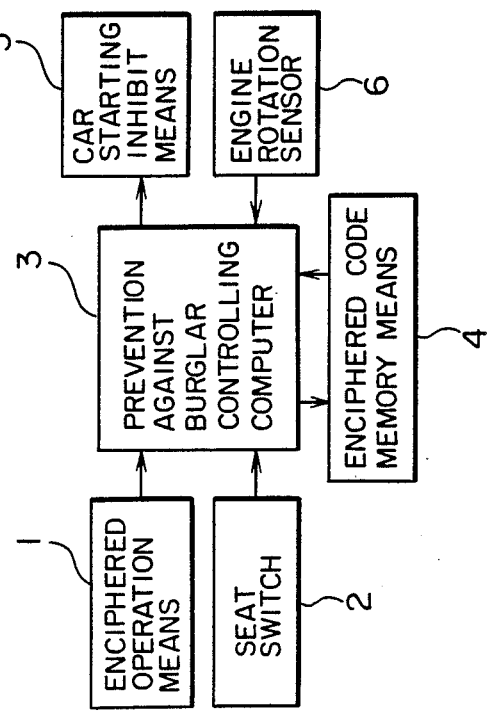
FIG. 11 is a block diagram representing another embodiment of the invention.

FIG. 11 is a block diagram representing another embodiment of the invention. Reference characters coordinate with those of FIG. 1. Then, 6 denotes an engine rotation sensor. An engine state is monitored by the engine rotation sensor 6, and the car starting inhibit means 5 is actuated upon start-up of an engine. Accordingly, the car starting inhibit means 5 will be actuated not only at the time when a driver gets off while the engine is rotating but also at the time when the engine is started.

The embodiment has been contrived in consideration of the following circumstances.

A thief to burglarize a car will think it suspicious why the car does not start despite engine running, and it is conceivable that he tamper with each operating portion of a driver seat for starting the car anyhow. It is then forecasted that he shut down the engine once by turning a key switch and start up next.

However, there may be a case where an operation of the car starting inhibit means 5 is released from shutting down the engine by turning the key switch. For example, there may be such construction wherein a wiring is made so that a power of the prevention against burglar controlling computer 3 will be cut off when the engine is shut down. If so, then a car is ready for starting when the engine is restarted, and thus is burglarized. Accordingly, it is necessary that counterplans be considered so as not to have the car burglarized also at the time of engine start-up. One counterplan may be such that a prior art prevention against car burglar with a burglar preventing switch included in an engine starting circuit is provided in addition. Another counterplan is to actuate the car starting inhibit means 5 on a signal from the engine rotation sensor 6.

As described above, even in case an operation of the car starting inhibit means 5 is released when the engine is shut down, a burglar at the time of engine start-up can be prevented by utilizing newly a signal from the engine rotation sensor 6.

Figure 12:
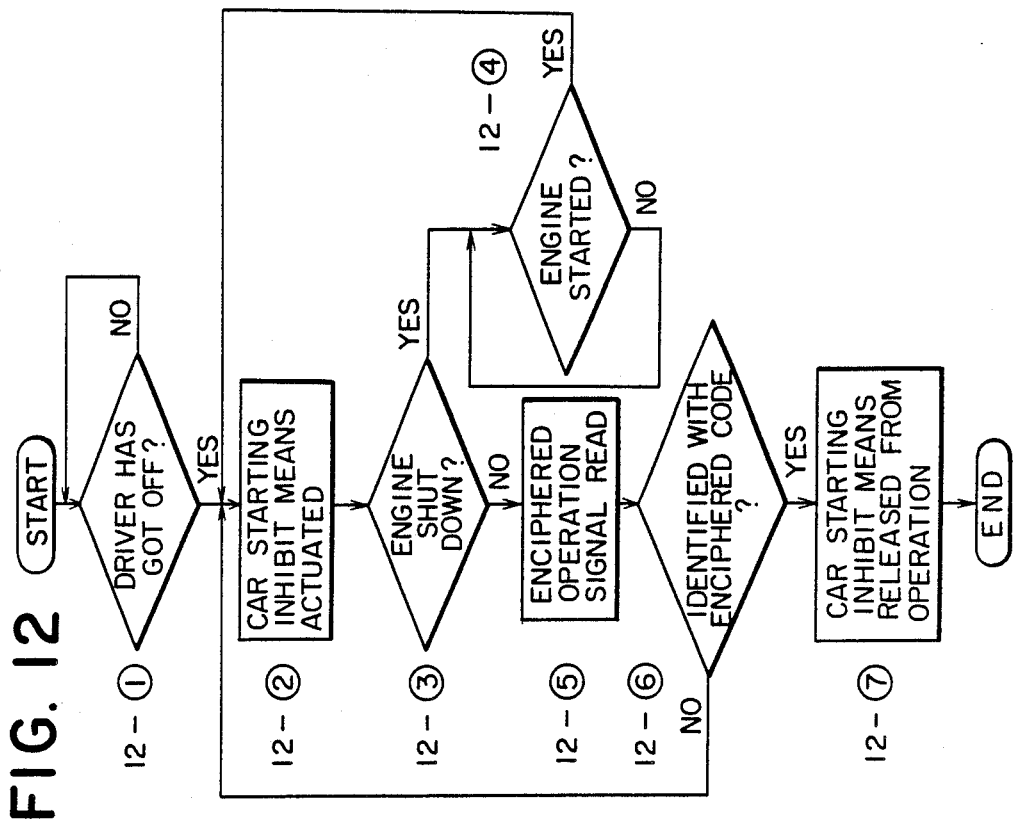
FIG. 12 is a flowchart for illustrating an operation of the block diagram of FIG. 11.

FIG. 12 is a flowchart for illustrating an operation of the embodiment of FIG. 11. Items 12 - 1 to 12 7 in the explanation of FIG. 12 are coordinated with steps 12 - 1 to 12 - 7 of FIG. 12.

12 - 7 Decides whether or not a driver gets off according to a signal from the seat switch 2.

12 - 2 If the driver has got off, then a signal is sent to the car starting inhibit means 5 from the prevention against burglar controlling computer 3, thereby actuating the car starting inhibit means 5 to a state wherein the car cannot be started.

12 - 3 Detects whether or not the engine has been shut down according to the engine rotation sensor 6.

The driver has left the car without stopping the engine, and hence it is conceivable that a thief to burglarize the car will think it suspicious why the car does not start and operate the key switch to shut down the engine. This will be detected here.

12 - 4 Where the engine has been stopped, whether or not it is restarted is detected.

If not started, the car does not go, and hence will never be burglarized. The car is capable of being burglarized when started. Accordingly, the procedure returns to step 12 - 4 to actuate the car starting inhibit means 5.

Then, when the driver operates for starting, he is subjected to a check by step 12 - 4 .

12 - 5 Reads an enciphered operation signal generated by the enciphered operation means 1.

12 - 5 The car's driver is then acquainted with the enciphered operation, therefore he is capable of generating a correct enciphered operation signal, but the signal cannot be generated by anybody else.

12 - 6 Checks to ensure that the read signal is identified with an enciphered code stored beforehand in the enciphered code memory means 4.

If not identified, the procedure returns to step 2 .

12 - 7 If identified, an operation of the car starting inhibit means 5 is released to a state ready for starting.

Figure 13:
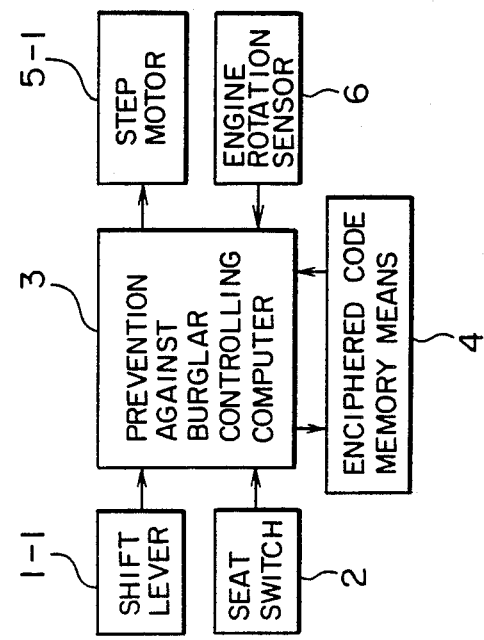
FIG. 13 is a block diagram representing an illustrative example of the embodiment of FIG. 11.

FIG. 13 is a block diagram representing an illustrative example of the embodiment of FIG. 11.

The embodiment utilizes the shift lever 1-1 with a shift switch (switch turned on according to a gear position) as the enciphered operation means 1, and the step motor 5-1 for controlling a feed of fuel which is used for throttle control (gasoline car) and injection control (Diesel car) as the car starting inhibit means 5.

Figure 14:
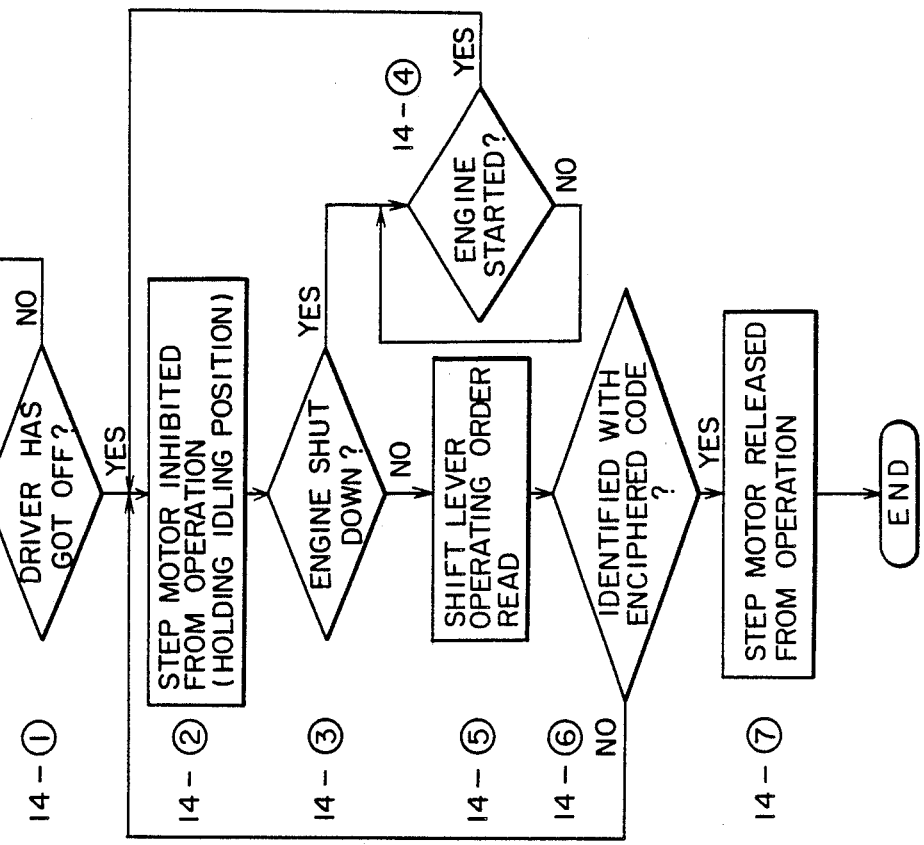
FIG. 14 is a flowchart for illustrating an operation of the block diagram of FIG. 13.

FIG. 14 is a flowchart for illustrating an operation of the illustrative example of FIG. 13. When a car is inhibited from starting (step 14 - 2 ), the step motor is made to hold an idling position. When the car is allowed to start (step 14 - 7 ), it may be isolated from the idling position. Other operations will easily be understood from referring to FIG. 12, therefore a further detailed description is omitted here.

Figure 15:
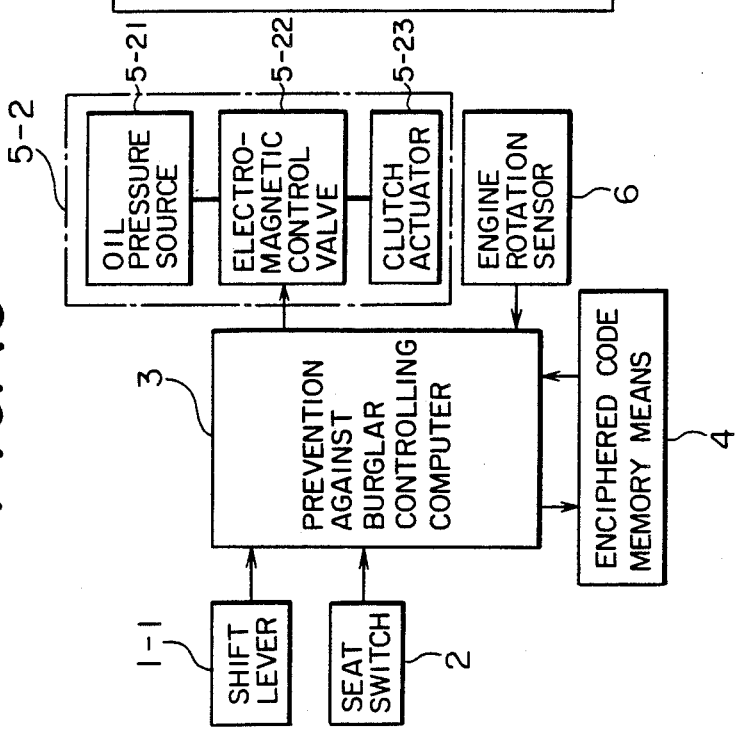
FIG. 15 is a block diagram representing another illustrative example of the embodiment of FIG. 11.

FIG. 15 is a block diagram representing another illustrative example of the embodiment of FIG. 11. The illustrative example utilizes the shift lever 1—1 as the enciphered operation means, and the clutch control part 5-2 as the car starting inhibit means.

Figure 16:
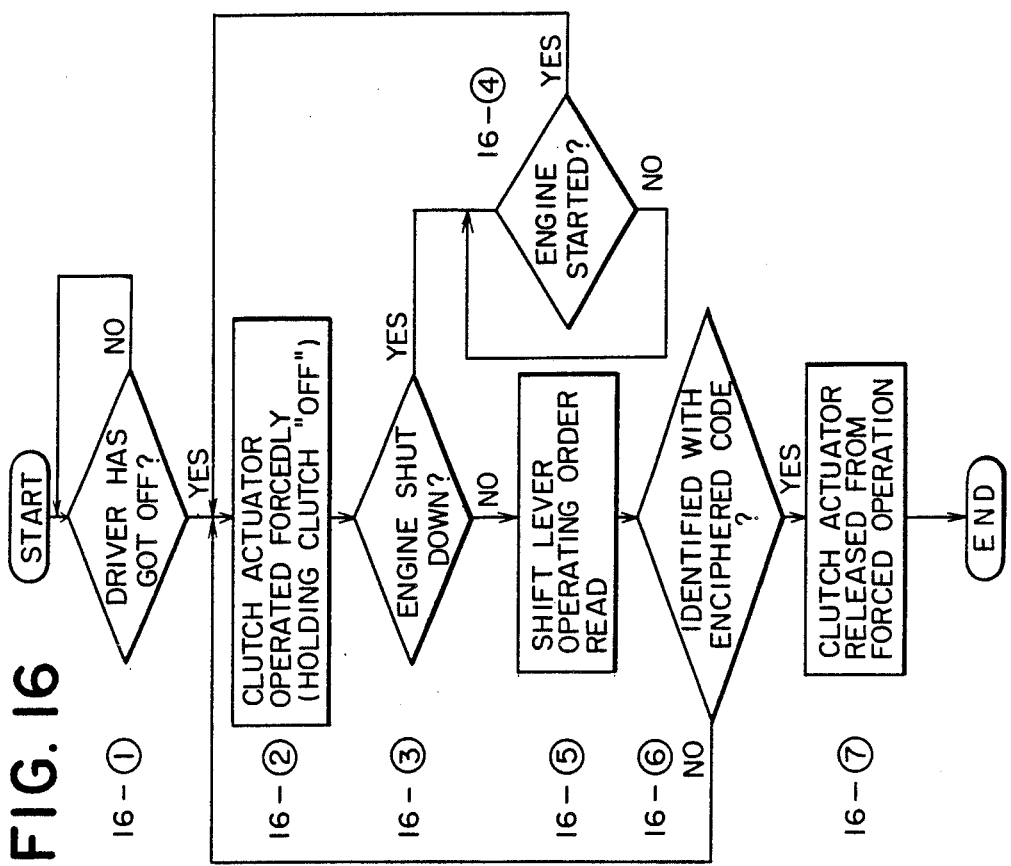
FIG. 16 is a flowchart for illustrating an operation of the block diagram of FIG. 15.

FIG. 16 is a flowchart for illustrating an operation of the illustrative example of FIG. 15. The operation will be understood easily from referring to FIG. 12, therefore a further detailed description is omitted here.

FIG. 17 is a block diagram representing a further illustrative example of the embodiment of FIG. 11. The illustrative example utilizes the shift lever 1-1 as the enciphered operation means, and the transmission control part 5-3 as the car starting inhibit means.

FIG. 18 is a flowchart for illustrating an operation of the illustrative example of FIG. 17. The operation will be understood easily from referring to FIG. 12, therefore a further detailed description is omitted here.

Figure 19:
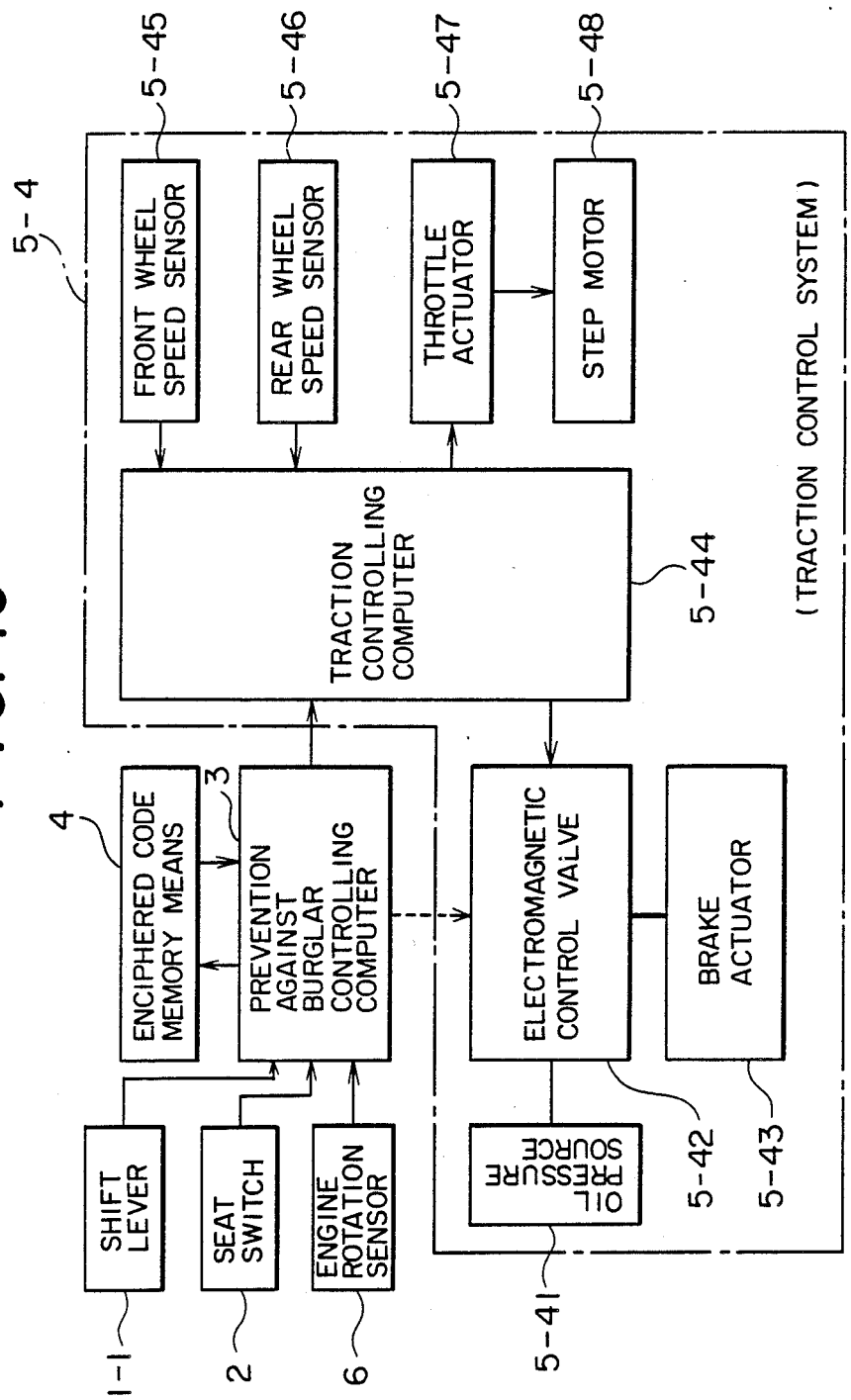
FIG. 19 is a block diagram representing another illustrative example of the embodiment of FIG. 11.

FIG. 19 is a block diagram representing another illustrative example of the embodiment of FIG. 11. The illustrative example utilizes the shift lever 1-1 as the enciphered operation means, and the traction control system 5-4 as the car starting inhibit means.

Figure 20:
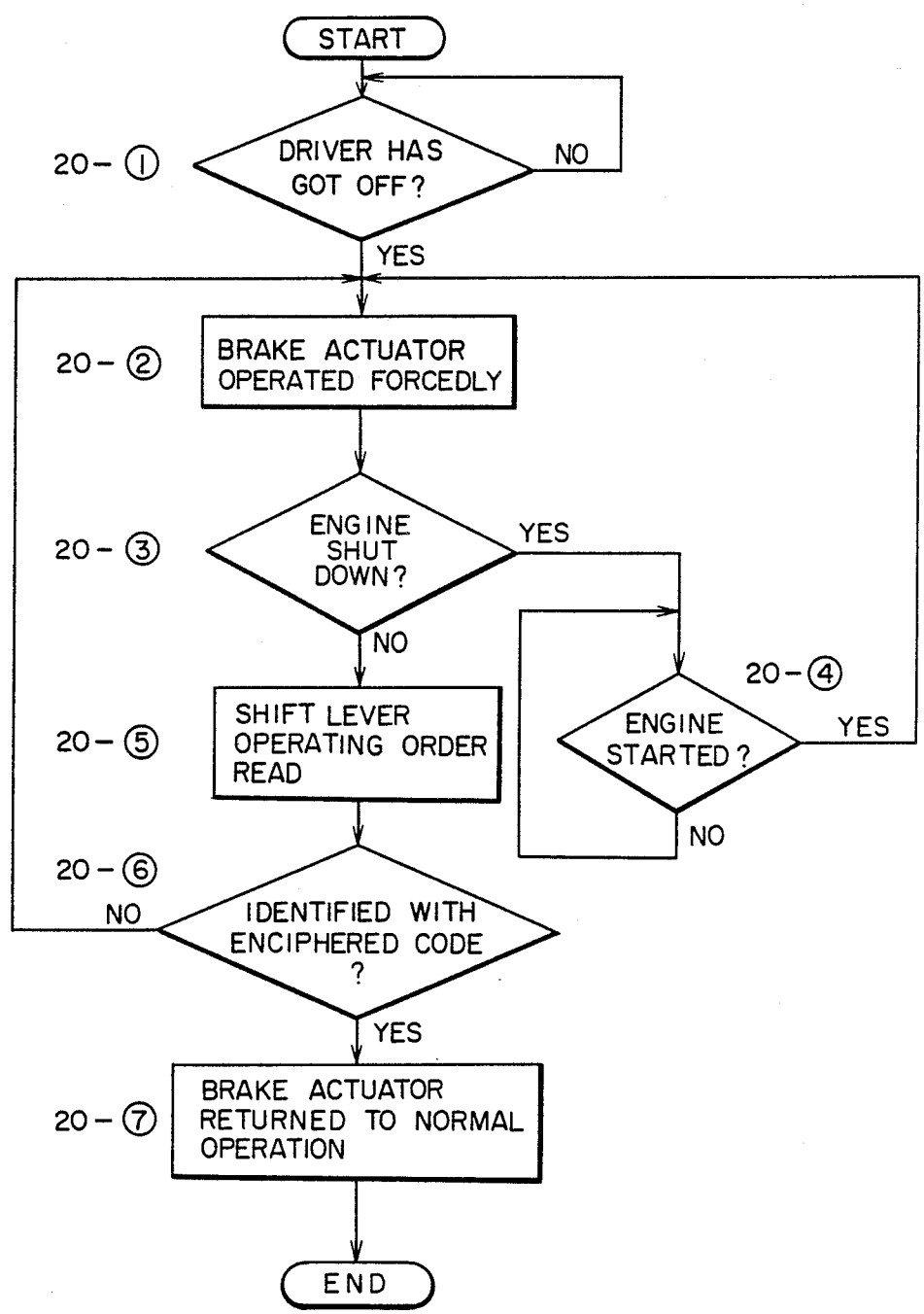
FIG. 20 is a flowchart for illustrating an operation of the block diagram of FIG. 19.

FIG. 20 is a flowchart for illustrating an operation of the illustrative example of FIG. 19. The operation will also be understood easily from referring to FIG. 12, therefore a detailed description is omitted here.

In each example described above, the shift lever 1-1 is utilized as the enciphered operation means 1, and various ones are indicated to work as the car starting inhibit means 5. However, as described hereinbefore, any construction may be employed for the enciphered operation means 1 subject to being operable before starting of a car and generating an electrical signal.

For example, the enciphered operation may be determined as "first operation . . . ON→OFF operation of a small lamp provided by a head lamp, second operation . . . stepping on a brake pedal twice (a brake switch turned to ON→OFF twice), third operation . . . ON→OFF operation of a wiper switch".

In any case, the operation may be meaningless to have nothing to do with a starting operation.

Thus, if a driver leaves a car as engine idling, the car will never be burglarized before he comes back.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A prevention against car burglar comprising enciphered operation means capable of generating an electrical signal, a seat switch, enciphered code memory means, car starting inhibit means utilizing equipment other than an engine starting system, an engine rotation sensor, prevention against burglar controlling computer, which is characterized in that said car starting inhibit means is kept operating when a driver gets off as an engine idling, an operation of said car starting inhibit means it released when an enciphered operation signal generated by said enciphered operation means is identified with an enciphered code of said enciphered code memory means.

2. The prevention against car burglar as defined in claim 1, wherein a step motor for controlling a fuel fed to an engine is used as said car starting inhibit means.

3. The prevention against car burglar as defined in claim 1, wherein a clutch control part is used as said car starting inhibit means.

4. The prevention against car burglar as defined in claim 1, wherein a transmission control part is used as said car starting inhibit means.

5. The prevention against car burglar as defined in claim 1, wherein a traction control system is used as said car starting inhibit means.

6. The prevention against car burglar as defined in claim 1, wherein a shift lever is used as said enciphered operation means.

7. The prevention against car burglar as defined in claim 1, wherein a lamp switch is used as said enciphered operation means.

8. The prevention against car burglar as defined in claim 1, wherein a wiper switch is used as said enciphered operation means.

9. A prevention against car burglar comprising enciphered operation means capable of generating an electrical signal, a seat switch, enciphered code memory means, car starting inhibit means utilizing equipment other than an engine starting system, an engine rotation sensor, prevention against burglar controlling computer, which is characterized in that said car starting inhibit means is kept operating when a driver gets off as an engine idling and the engine is started, an operation of said car starting inhibit means is released when an enciphered operation signal generated by said enciphered operation means is identified with an enciphered code of said enciphered code memory means.

10. The prevention against car burglar as defined in claim 9, wherein a step motor for controlling a fuel fed to an engine is used as said car starting inhibit means.

11. The prevention against car burglar as defined in claim 9, wherein a clutch control part is used as said car starting inhibit means.

12. The prevention against car burglar as defined in claim 9, wherein a transmission control part is used as said car starting inhibit means.

13. The prevention against car burglar as defined in claim 9, wherein a traction control system is used as said car starting inhibit means.

14. The prevention against car burglar as defined in claim 9, wherein a shift lever is used as said enciphered operation means.

15. The prevention against car burglar as defined in claim 9, wherein a lamp switch is used as said enciphered operation means.

16. The prevention against car burglar as defined in claim 9, wherein a wiper switch is used as said enciphered operation means.

* * * * *